United States Patent Office 3,271,431
Patented Sept. 6, 1966

3,271,431
POLYAMIDES OF POLYBASIC ARALIPHATIC
CARBOXYLIC ACIDS
Josef Baltes, Hamburg, and Friedrich Weghorst and Zdzislaw Makus, Hamburg-Harburg, Germany, assignors to Harburger Fettchemie Brinckman & Mergell G.m.b.H., Hamburg-Harburg, Germany, a corporation of Germany
No Drawing. Filed Apr. 15, 1963, Ser. No. 272,866
8 Claims. (Cl. 260—404.5)

This invention relates to the manufacture of thermoplastic polycondensates from polybasic araliphatic carboxylic acids, or derivatives thereof, and polyamines.

It is known that certain polymerised fatty acids, generally referred to as dimeric fatty acids, on polycondensation with polyamines lead to polycondensates of low to medium molecular weights which are liquid to high-melting depending on the kind and proportions of the starting materials used (see United States specification No. 2,450,940). From equimolecular amounts of bifunctional polyamines and "dimeric" fatty acids with if desired a short-chain dicarboxylic acid such as adipic acid, sebacic acid or the like, there are obtained polyamides melting between about 90° and 190° C., that have only a minor residual content of free amine or carboxyl groups. When on the other hand, an excess of polyamine or of the polycarboxylic acid is used, there are obtained so-called reactive, semi-solid polyamides having a varying but considerable content of free amine or carboxyl groups. Trifunctional and higher functional polyamines likewise yield with equimolecular proportions of dimeric fatty acids reactive polyamides which, however, are liquid at room temperature (see United States specification No. 2,379,413). These polyamides are used in a wide variety of ways, which depend on their chemical structure and properties. The high melting types are used either as such or modified with plasticizers, other resins, waxes and the like, for example as thermoplastic casting resins, sealing and potting compositions, putties, adhesives and coating compounds. The reactive types may be used as plasticizers for the high-melting types and may also be reacted with other thermoplastic, reactive resins, for example with epoxy resins and phenol resins, whereby they undergo "curing" and form infusible, extremely resistant substances. A comprehensive description of substances of this kind will be found in D. E. Floyd, Polyamide Resins, New York/London, 1958.

Although the polyamides obtained from dimeric fatty acids possess the above mentioned valuable properties, they also have serious shortcomings attributable primarily to the constitution and composition of the dimeric fatty acids. The commercial dimeric fatty acids do not consist only of dibasic carboxylic acids, but contain substantial proportions as a rule 20 to 25% of tribasic and higher functional carboxylic acids. This stems from their method of manufacture, more particularly from the oligomerization of polyunsaturated fatty acids giving rise to polycarboxylic acids of differing functionalities, namely dimeric, trimeric, tetrameric and higher polymeric acids. While it is technically possible to isolate the truly dimeric and thus dicarboxylic acids from such a mixture in a relatively pure state, this would be unjustifiably costly, quite apart from the fact that not much use could be found for the resulting higher polycarboxylic acids.

The presence of these higher polycarboxylic acids in the "dimeric" fatty acids used in the manufacture of the polyamides involves the risk of premature cross-linking reactions and of attendant gelling which renders both the manufacture of the polyamides and their use very difficult. As is generally known, this difficulty finds its expression above all in the unsatisfactory thermostability of the polyamides produced in this way which, while it can be counteracted to a certain extent by using special techniques in their use and by working in the presence of additives that inhibit cross-linking, cannot be completely overcome. Further disadvantages that limit the usefulness of the polyamides is their relatively high viscosity, and their tendency to undergo oxidation, which is particularly evident with the solid types, which tend to form a skin on their melts. However, there can be no doubt that this class of polyamides with their numerous possible uses and their extreme resistance to a wide variety of agents is potentially very valuable indeed, and it is clearly very desirable to eliminate the above drawbacks, or at elast to mitigate them as far as possible.

According to the present invention polyamides are made by polycondensing with a polyamine polybasic araliphatic carboxylic acids and/or their amide forming derivatives, prepared by cationic copolymerization of conjugated unsaturated fatty acids or derivatives thereof and aromatic vinyl compounds as described in our copending application No. 272,873, filed April 15, 1963. The araliphatic carboxylic acids in question are made by cationic copolymerization of conjugated unsaturated ("conjoint") fatty acids, or their derivatives, with aromatic vinyl compounds, such as styrene and styrene homologues in the ratio of 0.2 to 5 mols, preferably 0.5 to 2 mols, of the aromatic vinyl compound for every mol of conjoint fatty acid, at a temperature not exceeding 200° C., preferably at 50° to 150° C.

As suitable starting materials for this process there may be mentioned both naturally occurring conjoint fatty acids and those synthesized from non-conjugated unsaturated fatty acids and their derivatives, primarily their esters with monohydric alcohols having 1 to 4 carbon atoms in the molecule such as eleostearic acid, licanic (couepic) acid, dehydrogenated castor oil fatty acid, isomerized linoleic acid, isomerized linolenic acid and isomerized polyene fatty acids of the oils from marine animals. Likewise suitable are mixtures of such acids with other unsaturated fatty acids, and fats and oils containing such fatty acid mixture in a combined form, such as wood oil, oiticica oil, dehydrogenated castor oil and isomerized oils such as soybean oil, sunflower oil, cottonseed oil, safflower oil, corn oil, linseed oil, perilla oil, and oils from marine animals.

From the copolymers it is possible to remove any constituents of low molecular weight, such as unreacted fatty acids and their compounds, unreacted aromatic vinyl compounds, vinylated monocarboxylic acids or derivatives thereof, and solvents—if necessary after hydrolysis or alcoholysis with monohydric alcohols containing 1 to 4 carbon atoms—partially or completely, preferably by distillation.

As well as the araliphatic polycarboxylic acids there may be used in the present process low-molecular dibasic carboxylic acids, such as adipic, sebacic, isophthalic and terephthalic acids and polymerized fatty acids.

Suitable polyamines are primary and secondary amines containing at least two amino groups, such as ethylene diamine, diethylene triamine, triethylene tetramine, tetraethylene pentamine, hexamethylene diamine or phenylene diamine, and mixtures of two or more of these.

The kind and proportions of the reactants used in the polycondensation are selected to give a polyamide of the desired type, taking into consideration their acidity and basicity, expressed by their acid number and saponification number respectively, as well as by their amine number. Equivalent amounts of substantially dicarboxylic acids or their derivatives and of diamines give rise to resins that melt between 60° and 120° C. and contain only a very minor number of free carboxyl or amino groups. Resins that melt between 120° and 200° C. but have otherwise similar properties can be prepared by replacing part of the araliphatic polycarboxylic acids by the dicarboxylic acids of low molecular weight. When an excess of polyamine or polycarboxylic acid is used, there are obtained reactive polyamides containing free amino or carboxyl groups respectively in a proportion expressed by the amine number and acid number respectively. When esters of araliphatic polycarboxylic acids are used, reactive polyamides are obtained, as is to be expected, only when an excess of polyamine is used. Polyamide resins that are liquid at room temperature or melt from 25° to 75° C. can be prepared from araliphatic polycarboxylic acids or their esters, and aliphatic polyamines in which the primary amino groups are linked by at least 3 carbon or other atoms. Suitable polyamines of this description are, for example, diethylene triamine, triethylene tetramine, tetraethylene pentamine, hexamethylene diamine. Depending on the selected proportions of polycarboxylic acid and polyamine, and depending on the way in which the condensation is performed, it is possible to react all, or only the primary, or only some of the primary amine groups. In the two latter cases polyamides which are reactive on account of their content of free amino groups are obtained.

The polyamides can be made from the araliphatic polycarboxylic acids or their amide-forming derivatives under the usual amidating conditions as shown in the examples. Starting from carboxylic acids there are at first obtained the corresponding ammonium salts, which on being heated are converted into the desired polyamides, with elimination of water; the corresponding esters, likewise on heating, give immediate rise to these polyamides by way of an aminolysis accompanied by the liberation of the corresponding alcohol. The temperature used and the period for which this reaction is to be carried out depend on the kind and proportions of the reactants used and on the final products aimed at. The main reaction is generally performed by heating for several hours at 120° to 180° C., and the poly-condensation is finally completed while raising the temperature to about 200° to 230° C. To ensure completion of the reaction the amount of water or alcohol eliminated must correspond to the calculated amount, and no loss of polyamine should accompany its removal. If desired, the amidation may be performed under reduced pressure and in the presence of an inert solvent, such as an aromatic hydrocarbon or an aliphatic alcohol.

The risk of cross-linking and the attendant gelling of the reaction batches, such as exists when previously known "dimeric" fatty acids are used, do not arise with the araliphatic polycarboxylic acids or their derivatives when the reaction is conducted within the temperature ranges specified above. Neither a rapid rise in temperature nor sustained heating for several hours at the abovementioned upper temperature limits have any important adverse effect on the reaction batches, and certainly do not render them entirely useless. This is one of the foremost advantages of the invention.

Depending on the kind and proportions of the starting materials the final products are liquid to syrupy, or soft to hard to glass hard substances of substantially water clear to yellowish brown color. Their molecular weight ranges from about 700 to 5000. They are more or less completely soluble in polar solvents, such as halogenated hydrocarbons, aliphatic alcohols and aromatic hydrocarbons such as toluene and xylene. Particularly good solubility is observed in mixtures of these aromatic hydrocarbons with aliphatic alcohols, such as isopropanol and butanols. While polyamides from "dimeric" fatty acids are only restrictedly compatible with other substances, the novel polyamide resins are unexpectedly compatible with a wide variety of other groups of substances. They are miscible, for example, with epoxy resins, phenolic resins and aminoplasts, natural rubber, various synthetic elastomers, polyvinyl chloride, polyvinylidene chloride, polyethylene, polypropylene, polystyrene, coumarone resins, thermoplastic polyurethanes, many polyesters such as alkyd resins and the like, and waxes, and they are also compatible with some petroleum products, such as $SO_2$-extracts with certain types of bitumen, and with coal tar and asphalts. By virtue of their polar structure they display an unusual power of adhesion; they adhere extremely firmly to metals, timber, glass and a wide variety of plastics. Their unusual and unexpected stability towards heat and oxidation, in addition to their extraordinary resistance towards the action of acids, alkalis and numerous solvents (except, of course, those referred to above), constitutes a further considerable advantage since it improves very substantially their technical properties, and also their ease of handling.

The properties described above open up a wide field of application for these novel polyamides. They may be used by themselves or in admixture with other substances, for example in the manufacture of paints, printing inks, foils, cast or moulded components, sealing and potting masses or adhesives. The reactive types react with other reactive resins, with or without heating, to form spatially cross-linked, infusible substances. Such mixtures are in demand as self-curing compounds since they are suitable for many uses, for example in the manufacture of reaction lacquers, self-curing sealing compounds and adhesives, and the like.

The following examples illustrate the invention.

*Example 1*

Isomerized soybean oil fatty acid methyl ester (containing 56% of conjugated-unsaturated fatty acid methyl ester) was subject to a cationic polymerization with styrene in the ratio of 1.12 mols of styrene per mol of ester in the known manner. The constituents of the reaction mixture volatile up to 260° C. under 0.6 mm. Hg pressure were then distilled off, to furnish a polycarboxylic ester product consisting substantially of araliphatic dicarboxylic acid methyl ester, of a faintly yellowish color, in a yield of 65% on the ester starting material. The saponification number of the product was 148.2, corresponding to an equivalent weight of 378.

38 kg. of the above araliphatic polycarboxylic acid methyl ester and 3 kg. of ethylene diamine of about 98% purity (equivalent ratio about 1:1) were stirred and heated under nitrogen to 120° C. and then refluxed for 1 hour at this temperature. The methanol liberated was distilled off, and the temperature of the reaction mixture was gradually raised within 4 hours to 200° to 220° C. and maintained at this level for 1 hour longer. During this operation a total of 3.2 kg. of distillate was obtained, consisting of 3.1 kg. of methanol and about 100 grams of ethylene diamine, which correspond to the theoretical amounts to be expected. After cooling to about 130° C. under nitrogen the reaction mixture was transferred to a flat metal dish having a coating of polytetrafluoroethylene and allowed to cool completely. The resulting resin was of a light-yellow color and glass clear, and has an amine number <5; it melted at 90°–92° C. and had a viscosity of 843 centipoises measured at 150° C. in a rotary viscosimeter.

To test the resin for its stability towards heat and oxidation, specimens of 100 g. each were heated in air in Petri dishes at 160° C. and 220° C. respectively for prolonged periods. The specimens heated at 160° C. showed no appreciable change in aspect or viscosity after 20 hours. The specimens heated at 220° C. were appreciably discolored after 3 hours and after 3½ hours they formed single brownish flocks, while the viscosity rose within 4 hours from 843 to 2176 centipoises, measured at 150° C.

In comparison a polyamide resin prepared from commercial dimeric fatty acids and ethylene diamine in the equivalent ratio of 1:1 had formed a skin after being kept for 15 minutes at 200° C. in air, and after 1½ hours it had turned into a gel.

Araliphatic dicarboxylic acid methyl esters prepared by copolymerizing wood oil fatty acid methyl esters, and dicarboxylic acids prepared by copolymerizing dehydrogenated castor oil fatty acids, with mixtures of styrene and alpha-methylstyrene (90 parts of styrene:10 parts of alpha-methylstyrene) in the manner described above furnished on polycondensation with ethylene diamine in the above manner resins having substantially identical properties.

*Example II*

38 kg. of the araliphatic polycarboxylic acid methyl ester derived from the isomerized soybean ester described in Example 1 and 6 kg. of ethylene diamine of about 98% purity (equivalent ratio about 1:2) were condensed under the conditions described in Example I, to yield a total of 3.3 kg. of distillate consisting of 3.1 kg. of methanol and 200 grams of ethylene diamine. The resulting resin was soft at room temperature and had an amine number of 121 and a viscosity of about 60 centipoises measured at 150° C., in a rotary viscosimeter.

A specimen kept at 160° C. in air did not show any appreciable change after 16 hours, except that its viscosity had risen to 190 centipoises (measured at 150° C.). After the specimen had been heated for 7 hours at 220° C. under otherwise identical conditions, it showed only a brown coloration, while the viscosity had again only risen to 190 centipoises. No other changes, such as skin formation or exudation of constituents that had become infusible, had occurred.

In comparison a polyamide prepared from commercial dimeric fatty acids but of otherwise identical composition had completely gelatinized after only 7 hours' heating at 220° C. This product had originally a viscosity of 1170 centipoises which, after only 2 hours' heating at 220° C., had risen to 2475 centipoises (measured at 150° C.).

*Example III*

75 kg. of the araliphatic polycarboxylic acid methyl ester described in Example I and 7.6 kg. of the same ethylene diamine were condensed at 160° C., initially under the conditions of Example I. 5 kg. of sebacic acid were then added and the condensation was completed at 200°–220° C. in the course of 2 hours, during which a total of 9 liters of a distillate consisting of water and methanol was obtained. The resulting resin was transparent and glass hard at room temperature. Its amine number was below 3 and its acid number about 10. Its melting point was 150° to 155° C.

By raising the amounts of ethylene diamine and sebacic acid to 9.1 kg. and 10.1 kg. respectively, all other conditions being equal, there were obtained resins having an upper melting point of about 200° C. A specimen of the polyamide melting at 150° to 155° C. after having been heated for 1 hour in air at 220° C. was found to have developed a light skin and after another 3 hours it had gelatinized. Polyamides of identical type, manufactured from commercial dimeric fatty acids, exuded immediately after melting constituents that had become infusible.

The stability properties of these novel resins become even more evident when they are mixed with the polyamide described in Example II. For example: A mixture of 50 parts of a resin prepared as described in this example (melting at 155° C.) and 50 parts of a resin according to Example II, after having been heated for 24 hours in air at 160° C. and at 220° C., showed no change apart from a faint brown coloration. In comparison, similar polyamide mixtures prepared from commercial dimeric fatty acids formed a skin after only 8 hours' heating in air at 160° C., and after having been heated for 8 hours at 220° C. they had completely gelatinized.

*Example IV*

93 kg. of the araliphatic polycarboxylic acid methyl ester of Example I and 26.6 kg. of diethylene triamine of purity about 95% (molecular ratio about 1:2) were condensed under the conditions described in Example I. A total of 10 liters of methanol and 50 g. of diethylene triamine was obtained as distillate. The reaction product was liquid at room temperature and of syrupy consistency.

Its amine number was 283 and its viscosity 5300 centipoises (measured at 50° C.).

The manufacture of the polycondensates of carboxylic acids and aromatic vinyl compounds which are the base materials utilized in this invention is described and claimed by us in our United States patent application entitled Process for the Manufacture of Polybasic Araliphatic Carboxylic Acids and of Derivatives Thereof, Serial No. 272,873, filed simultaneously herewith. The entire disclosure of the said application is herein incorporated by reference. As pointed out in said copending application Serial No. 272,873, there are prepared polybasic aralipatic carboxylic compounds by subjecting the conjugated unsaturated fatty acid compound selected from the class of conjugated unsaturated fatty acids and $C_1$ to $C_4$ alkanol esters of the said acids to ionic copolymerization with an aromatic vinyl compound selected from the class consisting of styrene and homologs of styrene, more particularly, styrene, alpha-methyl styrene and vinyl toluene, in the proportion of 1 mole of fatty acid compound to 0.2 to 5 moles of aromatic vinyl compound and controlling the temperature of the reacting mass to prevent the mass temperature from exceeding at any time a temperature of about 200° C., subsequently removing volatile products of the reaction by distilling the mass at atmospheric pressure, and recovering the product.

We claim:

1. A polyamide prepared by a process which comprises condensing a polyamine having 2 to 5 amino groups with a polybasic araliphatic carboxylic compound, said compound having been prepared by subjecting a conjugated unsaturated fatty acid compound selected from the class consisting of conjugated unsaturated fatty acids and $C_1$ to $C_4$ alkanol esters of said acids to ionic copolymerization with an aromatic vinyl compound selected from the class consisting of styrene, alpha-methyl styrene and vinyl toluene in the proportion of 1 mole of fatty acid compound to 0.2 to 5 moles of aromatic vinyl compound and controlling the temperature of the reacting mass to prevent the mass temperature from exceeding at any time a temperature of about 200° C., said polyamide forming process comprising controlling the mass temperature throughout the course of the resulting reaction to maintain the temperature within the range of 120 to 230° C., subsequently removing volatile products and unreacted amine from the reaction mass and recovering the polyamide as the product.

2. A product according to claim 1 wherein the aromatic vinyl compound is styrene.

3. A product according to claim 1 wherein the conjugated unsaturated fatty acid compound is derived from isomerized soybean oil.

4. A product according to claim 1 wherein the polyamine is a diamine.

5. A product according to claim 1 wherein the polyamine is a diprimary amine.

6. A product according to claim 1 wherein the aromatic vinyl compound is a mixture of styrene and alpha-methyl styrene.

7. A product according to claim 1 wherein the carboxylic acid moiety of the starting polybasic araliphatic carboxylic compound is the carboxylic acid ester of a monohydric alcohol having 1 to 4 carbon atoms.

8. A product according to claim 1 wherein the aromatic vinyl compound is styrene and the fatty acid compound is derived from isomerized soybean oil.

References Cited by the Examiner
UNITED STATES PATENTS

| | | | |
|---|---|---|---|
| 2,450,940 | 10/1948 | Cowan et al. | 260—78 |
| 2,639,272 | 5/1953 | Griess et al. | 260—23 |
| 2,655,488 | 10/1953 | Kanning et al. | 260—23 |
| 2,952,648 | 9/1960 | Swann et al. | 260—23 |

JOSEPH L. SCHOFER, *Primary Examiner.*

W. HOOVER, *Assistant Examiner.*